(12) United States Patent
Kim et al.

(10) Patent No.: US 7,486,376 B2
(45) Date of Patent: Feb. 3, 2009

(54) BROADBAND REFLECTIVE POLARIZER FOR LIQUID CRYSTAL DISPLAY USING OVERCOATING METHOD

(75) Inventors: Sung-Tae Kim, Gwanak-gu (KR); Keon-Il Kim, Yuseong-gu (KR)

(73) Assignee: Samsung Fine Chemicals Co., Ltd., Ulsan (KR)

( * ) Notice: Subject to any disclaimer, the term of this patent is extended or adjusted under 35 U.S.C. 154(b) by 268 days.

(21) Appl. No.: 10/587,559

(22) PCT Filed: Nov. 19, 2004

(86) PCT No.: PCT/KR2004/003013

§ 371 (c)(1), (2), (4) Date: Jul. 31, 2006

(87) PCT Pub. No.: WO2006/014041

PCT Pub. Date: Feb. 9, 2006

(65) Prior Publication Data

US 2007/0166482 A1    Jul. 19, 2007

(30) Foreign Application Priority Data

Aug. 2, 2004  (KR) .............. 10-2004-0060853

(51) Int. Cl.
    G02F 1/13 (2006.01)
(52) U.S. Cl. ............... 349/194; 349/193; 349/115
(58) Field of Classification Search ............... 349/96, 349/104, 113, 115, 193, 194
    See application file for complete search history.

(56) References Cited

U.S. PATENT DOCUMENTS

| | | | |
|---|---|---|---|
| 5,050,966 A | 9/1991 | Berman | |
| 5,235,443 A | 8/1993 | Barnik et al. | |
| 6,016,177 A | 1/2000 | Motomura | |
| 6,061,108 A | 5/2000 | Anderson | |
| 6,088,079 A | 7/2000 | Kameyama | |
| 6,103,323 A | 8/2000 | Motomura | |
| 6,248,259 B1 | 6/2001 | Izumi | |
| 6,417,902 B1 | 7/2002 | Greenfield | |
| 6,421,107 B1 | 7/2002 | Greenfield | |
| 6,433,853 B1 | 8/2002 | Kameyama | |
| 2003/0151704 A1* | 8/2003 | Kawamoto et al. ............ 349/96 |

FOREIGN PATENT DOCUMENTS

| | | |
|---|---|---|
| JP | 11-044890 | 2/1999 |
| JP | 2002-169021 | 6/2002 |
| JP | 2004-029743 | 1/2004 |
| KR | 20040005420 | 1/2004 |

* cited by examiner

Primary Examiner—Kevin S Wood
(74) Attorney, Agent, or Firm—The Webb Law Firm

(57) ABSTRACT

The present invention relates to a method of manufacturing a reflective polarizing film for a liquid crystal display device in which cholesteric liquid crystal layers having different selective light-reflecting wavelengths are laminated in the laminated coating method, thus a forming liquid crystal film that covers a visible light region and ¼λ retardation film are attached to the liquid crystal film. In this case, two or more cholestric liquid crystal layers having different selective light-reflecting wavelengths are laminated in order from the shorter wavelength to the longer wavelength in the laminated coating method. Further, during the lamination, orientation layers are laminated between the liquid crystal layers to maximize the selective reflection characteristic of the cholesteric liquid crystal.

10 Claims, 1 Drawing Sheet

BROADBAND REFLECTIVE POLARIZER FOR LIQUID CRYSTAL DISPLAY USING OVERCOATING METHOD

TECHNICAL FIELD

The present invention relates to a method of fabrication of a reflective polarizing film for a liquid crystal display device, in which cholesteric liquid crystal layers having selective light-reflection central wavelengths different from one another are laminated in the laminated coating method, thus forming a liquid crystal film that covers a visible light region, and a quarter wave (¼λ) retardation film is attached on the top of the liquid crystal film.

BACKGROUND ART

A liquid crystal display (LCD) device that has been used typically employs a polarizing film using linearly polarized light. The polarizing film is fabricated by adsorbing an iodine or dichroic dye on a polyvinyl alcohol (PVA) film to form a resulting adsorbed film and stretching the resulting adsorbed film in a certain direction.

The polarizing film fabricated thus cannot be used as a practical polarizing film since its mechanical strength is weak with respect to the direction of a transmission axis and a polarizing function is significantly degraded due to shrinkage by heat or moisture.

In order to solve the above problems, a polarizing film having a structure in which an adhesive is adhered between supports such as an acetic acid cellulose film, etc. has been developed.

The polarizing film using the above-described polyvinyl alcohol film produces linearly polarized light by absorbing light that progresses in one direction while passing only light that vibrates in the other direction. Thus, efficiency of the polarizing film does not exceed 50% theoretically, which acts as the most significant factor to reduce the efficiency and brightness of an LCD.

If a reflective polarizing film formed by using cholesteric liquid crystal is additionally used, the shortcomings of the conventional polarizing films can be improved greatly. Cholesteric liquid crystals have a selective reflection characteristic in which a twisted direction of a spiral liquid crystal structure and an oriented direction of a circularly polarized light are consistent with each other and only a circularly polarized light of which wavelength is the same as the spiral pitch of the liquid crystal is reflected. If the selective reflection characteristic is employed, it is possible to fabricate a polarizing film that converts non-polarized light of a constant wavelength band into a specific circularly polarized light.

That is, if non-polarized light in which a left circularly polarized light component and a right circularly polarized light component are mixed equally is incident to a cholesteric liquid crystal film having a left-wind or right-wind spiral structure, a circularly polarized light of which direction is the same as the spiral direction is reflected and a circularly polarized light of which direction is in the opposite direction to the spiral direction is transmitted. At this time, the transmitted circularly polarized light is converted to a linearly polarized light after passing through a ¼λ retardation film. The circularly polarized light reflected thus has its polarization direction changed and transmitted if it is reflected again from a reflective plate. Thus, the whole circularly polarized light can transmit the liquid crystal film. Accordingly, if the polarizing film formed by using the cholesteric liquid crystal film is employed additionally, brightness can be improved significantly compared to the case in which only a conventional absorption type polarizing film that absorbs 50% light is used because there is no loss of light theoretically.

However, a backlight used in an LCD usually generates light of a visible band (400 to 700 nm) that is a region where colors are displayed. Therefore, the selective reflection wavelength region of the cholestric liquid crystal film has to cover the visible light region. If the selective reflection wavelength region of the cholestric liquid crystal film does not cover the visible light region, light of a certain wavelength which is not selectively reflected get into the polarizing film in a non-polarizing state. Accordingly, there is a problem that the picture quality of the LCD is degraded.

DISCLOSURE OF INVENTION

Accordingly, the present invention is provided in order to solve the above problems, and it is an object of the present invention to provide a method of manufacturing a broadband reflective polarizing film for a liquid crystal display device using a laminated coating method in which brightness is improved remarkably compared to that of the conventional polarizing films.

To achieve the above object, according to the present invention, cholesteric liquid crystal layers having selective light-reflecting central wavelengths different from one another are laminated in the laminated coating method to form a liquid crystal film that covers a visible ray. Orientation layers are coated between the liquid crystal layers one by one, thus improving the optical properties of cholesteric liquid crystals to the maximum.

BRIEF DESCRIPTION OF DRAWINGS

Further objects and advantages of the invention can be more fully understood from the following detailed description taken in conjunction with the accompanying drawings in which.

BEST MODE FOR CARRYING OUT THE INVENTION

Figure 1:
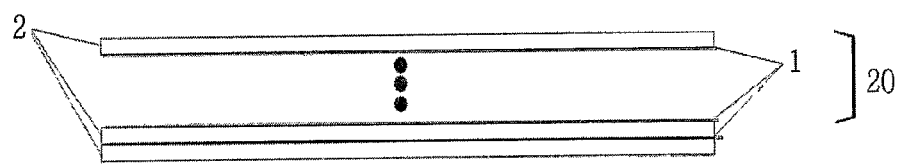
FIG. 1 is a cross-sectional view showing the structure of a film according to the present invention.
Figure 2:
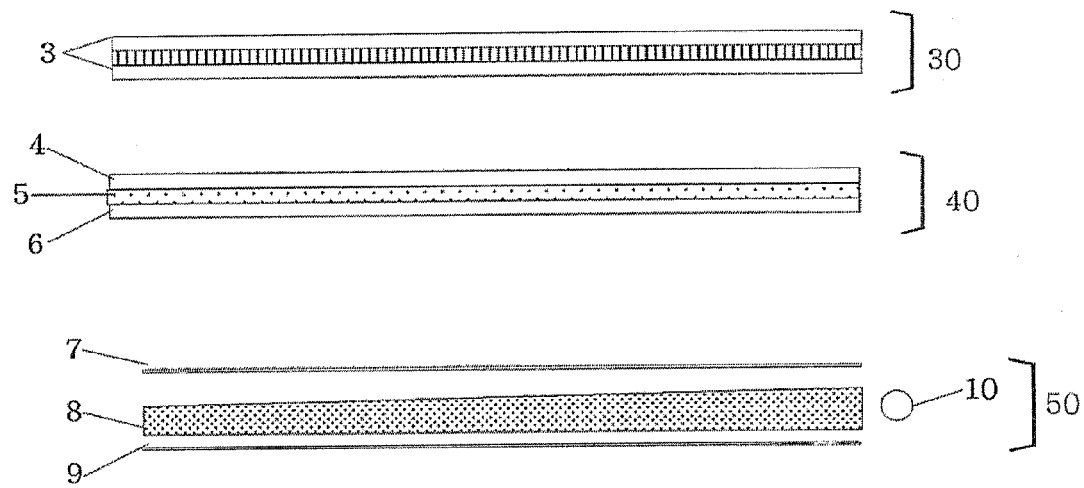
FIG. 2 is a cross-sectional view showing the structure of a liquid crystal display according to the present invention.

The present invention will now be described in detail in connection with preferred embodiments with reference to the accompanying drawings.

In the present invention, a cholesteric liquid crystal film that is formed by dissolving a curable cholesteric liquid crystal material and a photoinitiator in an organic solvent, coating them on a substrate and curing or polymerizing by irradiating the mixed material with UV. The cholesteric liquid crystal material is composed of a curable nematic liquid crystal material and a curable chiral material. It is possible to control a selective light-reflecting central wavelength depending on the composition of the two materials. The curable nematic liquid crystal material can be used if they are liquid crystal materials containing a mesogenic radical group representing a nematic liquid crystal. If a chiral material is a material having typical chiral carbons, it can be used. Thus, they are not limited to specific materials. In the present invention, any material which contains a thermal or ultraviolet reactive group in its molecular structure is acceptable for a curable material.

For example, in the case of curing, a combination of monomers having an alkenyl radical such as a vinyl radical, an acrylic radical, a methacrylic radical, a vinylidene radical, an aryl radical, etc., or various reactive groups that can be condensation-polymerized can be used. The ultraviolet-thermosetting radical may include a reactive group such as a vinyl radical, an acrylic radical, a methacrylic radical, a vinylidene radical, an aryl radical, etc. among the reactive groups, which can be cross-linked by ultraviolet ray. For curing or thermosetting, an initiator and an additive such as a leveling agent, etc., if needed, can be used.

When the liquid crystal material is coated, a plastic film such as PET (polyethyleneterephthalate), PVA (polyvinyl alcohol), TAC (tri-acetyl-cellulose), etc., can be used as a substrate. When coating the cholesteric liquid crystal material, a selective reflection characteristic can be assigned to the cholesteric liquid crystal material only when a horizontal orientation is guided. A method of guiding the horizontal orientation may include a method of forming a horizontal orientation film, a method of applying an electric field, a method of applying shear force, etc.

In the present invention, the method of using the horizontal orientation film is used in order to guide the orientation. In this method, an orientation film is coated on a substrate material and a cholesteric liquid crystal material is then coated on the orientation film to guide an orientation.

The horizontal orientation film may employ polyimide, polyvinyl alcohol, and their derivatives that are typically used in this field.

In order to manufacture a broadband cholesteric liquid crystal film that totally selectively reflects a visible ray region, a method of laminating cholestric liquid crystal films having different selective light-reflection central wavelengths is used.

Firstly, a horizontal orientation layer is coated on a plastic film in the roll coating method. A solution in which a cholestric liquid crystal material is dissolved is coated on the coated orientation film in the roll coating method. The liquid crystal material is oriented while drying a solvent through a dryer and then irradiated with UV. An orientation layer is coated on the cholestric liquid crystal film in the roll coating method. Cholestric liquid crystal solutions having different selective reflection wavelength regions are coated in the roll coating, dried, and irradiated with UV to form films. By employing the above method, the orientation film layers and the cholesteric liquid crystal layers are alternately laminated to form the broadband cholesteric liquid crystal film that totally reflects the visible ray region.

Light that passes through the cholesteric liquid crystal film is in a circularly polarized light state. Thus, the light has to be converted to a linearly polarized light so that it can be used in an LCD. This is solved by attaching a ¼λ phase film (a quarter wave retardation film).

The ¼λ phase film is formed by using PVA, PC, m-COC etc. In this case, a phase film having a retardation value of 115 to 125 nm is used.

The reflective polarizing film formed thus is inserted between a backlight unit and a liquid crystal panel of an LCD. At this time, the optical efficiency can be improved by removing the interface between the films by using an adhesive layer. It is found that the optical efficiency of a case where the air layer is removed by laminating the adhesive layer is 5% higher than that of a case where the air layer exists between the films. Therefore, in the case where the reflective polarizing film fabricated according to the present invention is integrally formed with the conventional absorption-type polarizing plate or a diffusion plate in such a manner that an adhesive layer is interposed between the reflective polarizing film and the absorption-type polarizing plate or the diffusion plate, the optical efficiency such as brightness, etc. can be improved by 10% or greater.

The present invention will now be described in more detail in connection with the following preferred embodiments. It is to be noted that the following preferred embodiments are only illustrative and the present invention is not limited to these preferred embodiments.

Preferred Embodiment 1

A cholesteric liquid crystal film was fabricated. A thermosetting cholesteric liquid crystal material (bifunctional acrylate based LC242 and LC756 available from BASF Corporation) was dissolved in a solvent in which methylethylketone (MEK) and toluene are mixed at a ratio of 6:4 to prepare for a solution having a concentration of 50 wt %. The solution was prepared for to have selective reflection central wavelengths of 430, 480, 520, 580, 650 and 720 nm by controlling the ratio of mixing of the nematic material (LC242) and the chiral material (LC756). A photoinitiator (IG184 available from Ciba-Geigy Corporation) of 5 wt % and a leveling additive (BYK361 available from BYK Corporation) of 0.2 wt % were added to the solution. Among the solutions formed in the above, firstly, the solution having a wavelength of 430 nm was thinly coated on a polyethyleneterephthalate (PET) substrate film on which a polyimide horizontal orientation layer (SE7492 available from Nissan Chemical Industries, Ltd.) is coated in the roll coating method. Thereafter, liquid crystal of the solution was oriented while drying the solvent in a dryer and irradiating with UV to form a film. At this time, the drying process was performed at a temperature of 85° C. and UV was illuminated by using a 300-W lamp (having the central wavelength of 360 nm).

A horizontal orientation film was thinly coated on the 430-nm cholesteric liquid crystal film in the roll coating method and then dried. At this time, the drying process was performed at a temperature of 85° C. Next, the cholesteric liquid crystal solution formed to have a selective wavelength of 480 nm was thinly coated, dried, and irradiated with UV in the same manner to form a film.

The cholesteric liquid crystal layers having the central wavelengths of selective reflection of 430, 480, 520, 580, 650 and 720 nm were laminated in order from shorter wavelength to longer wavelength by repeatedly performing the above laminated coating process. The thickness of each of the liquid crystal layers formed thus ranged from 3.5 to 4.5 microns and the total thickness of the film was 25 microns.

A ¼λ retardation film (having the central wavelength of 115 nm) in which a pressure sensitive adhesive (PSA) is coated on the shorter wavelength face of the liquid crystal film was compressed at a room temperature to form the final reflective polarizing plate.

It was found that brightness of the reflective polarizing film formed thus was improved by more than 40% compared to the case where an absorption-type polarizing film was used. (In this case, the absorption-type polarizing film was based on an NPF grade of Nitto Denko Corporation.)

Preferred Embodiment 2

A cholesteric liquid crystal film was fabricated. A curable cholesteric liquid crystal material (bifunctional acrylate based LC242 and LC756 available from BASF Corporation) was dissolved in a solvent in which methylethylketone (MEK) and toluene are mixed at a ratio of 6:4 to prepare for a solution having a concentration of 50 wt %. At this time, the solution was formed to have selective reflection central wavelengths of 435, 485, 520, 570, 620, 670, and 730 nm by controlling the ratio of mixing of the nematic material (LC242) and the chiral material (LC756). A photoinitiator (IG184 available from Ciba-Geigy Corporation) of 5 wt % and a leveling additive (BYK361 available from BYK Corporation) of 0.2 wt % were added to the solution. Among the solutions formed in the above, the solution having the wavelength of 435 nm was thinly coated on a polyethyleneterephthalate (PET) film on which a polyimide horizontal orientation film (SE7492 available from Nissan Chemical Industries, Ltd.) was coated in the roll coating method. Thereafter, liquid crystal of the solution was oriented while drying the solvent in a dryer and then irradiated with UV to form a film. At this time, the drying process was performed at a temperature of 85° C. and UV was illuminated by using a 300-W lamp (having the central wavelength of 360 nm).

A horizontal orientation layer was thinly coated on the 435-nm cholesteric liquid crystal film in the roll coating method and then dried. At this time, the drying process was performed at a temperature of 85° C. Next, the cholestric liquid crystal solution formed to have a selective wavelength of 485 nm was thinly coated, dried, and irradiated with UV in the same manner to form a film.

The cholesteric liquid crystal layers having the central wavelengths of selective reflection of 435, 485, 520, 570, 620, 670, and 730 nm were laminated sequentially in order from shorter wavelength to longer wavelength by repeatedly performing the above laminated coating process. The thickness of each of the liquid crystal layers formed thus ranged from 3.5 to 4.5 microns and the total thickness of the films was 25 microns.

A ¼λ retardation film (having the central wavelength of 115 nm) in which a pressure sensitive adhesive (PSA) is coated on the short wavelength face of the liquid crystal film was compressed at a room temperature to form the final reflective polarizing plate.

It was found that brightness of the reflective polarizing film formed thus was improved by more than 36% compared to the case where an absorption-type polarizing film was used.

INDUSTRIAL APPLICABILITY

As described in the above, according to the present invention, since the entire wavelength bands of the visible light region are selectively reflected, it is possible to significantly improve brightness of an LCD compared to that of the conventional absorption-type polarizing plates. Brightness is measured with an actual reflective polarizing plate mounted on an LCD panel. The results of measurement show that brightness in the case where the reflective polarizing plate of the present invention is used is 140, which means that brightness is improved by about 40% assuming that brightness when the reflective polarizing plate of the present invention is not used is 100.

What is claimed is:

1. A method of manufacturing a broadband reflective polarizing plate using a laminated coating technique, comprising the steps of:
   (a) coating a substrate film on which a first orientation layer is coated with a cholesteric liquid crystal solution;
   (b) irradiating a cholesteric liquid crystal coating layer formed in (a) with UV to form a liquid crystal film;
   (c) coating said liquid crystal layer formed in (b) with a second orientation layer;
   (d) coating said second orientation layer with said cholesteric liquid crystal solution having different selective light-reflecting central wavelengths on to form a cholesteric liquid crystal coating layer; and
   (e) irradiating said cholesteric liquid crystal coating layer with UV to form a cholesteric liquid crystal film,
   wherein two or more cholesteric liquid crystal layers having different selective light-reflecting central wavelengths, which are manufactured by repeatedly performing the above steps (c) to (e) once or more times, are sequentially laminated in order from shorter wavelength to longer wavelength in the laminated coating method, thus forming a broadband reflective polarizing plate covering the range of visible light as a selective reflection wavelength region.

2. The method of claim 1, wherein said cholesteric liquid crystal film is formed by mixing a curable nematic liquid crystal material and a curable chiral liquid crystal material and then irradiating the mixture with UV.

3. The method of claim 1, wherein said cholesteric liquid crystal film is formed in such a manner that the selective light-reflecting central wavelengths of said cholesteric liquid crystal layers are adjusted to be different by controlling the ratio of mixing of a nematic liquid crystal material and a chiral liquid crystal material and then irradiating the mixture with UV.

4. The method as claimed in claim 1, wherein said first and second orientation layers are films that can horizontally orientate a nematic liquid crystal.

5. A broadband reflective polarizing plate covering the range of visible light as a selective light-reflecting central wavelength, which is fabricated in the method according to any one of claims 1 to 4, wherein the number of said first and second orientation layers and cholesteric liquid crystal layers is two or more, the cholesteric liquid crystal layers have different selective light-reflecting central wavelengths, and the cholestric liquid crystal coating layers are laminated sequentially in order from shorter wavelength to longer wavelength in the laminated coating method.

6. A method of manufacturing a broadband reflective polarizing plate, comprising the steps of:
   (a) coating a substrate film on which a first orientation layer is coated with a cholesteric liquid crystal solution;
   (b) irradiating a cholesteric liquid crystal layer formed in (a) with light to form a liquid crystal film;
   (c) coating said liquid crystal layer formed in (b) with a second orientation layer;
   (d) coating said second orientation layer with said cholesteric liquid crystal solution having different selective light-reflecting central wavelengths on the orientation layer to form a cholesteric liquid crystal film; and
   (e) irradiating said cholesteric liquid crystal coating layer with light to form a cholesteric liquid crystal film,
   wherein two or more cholesteric liquid crystal layers having different selective light-reflecting central wavelengths, which are manufactured by repeatedly performing the above steps (c) to (e) once or more times, are sequentially laminated in order from shorter wavelength to longer wavelength in the laminated coating method, and a retardation film is laminated on the broadband reflective polarizing plate having a visible light region as a selective reflection wavelength region.

7. The method of claim 6, wherein said cholesteric liquid crystal film is formed by mixing a curable nematic liquid crystal material and a curable chiral liquid crystal material and then irradiating the mixture with UV.

8. The method of claimed claim 6, wherein said first and second orientation layers are films that can horizontally orientate a nematic liquid crystal.

9. The method of claim 6, wherein said phase-difference film is attached to the side of said cholesteric liquid crystal film having the shortest wavelength of said broadband reflective polarizing plate.

10. The broadband reflective polarizing plate manufactured by laminating reflective polarizing plate comprised of two or more laminated structures comprised of said first and second orientation layers and cholesteric liquid crystal layers manufactured according to any of claims 6 through 9, and a retardation film.

* * * * *